United States Patent Office 3,312,579
Patented Apr. 4, 1967

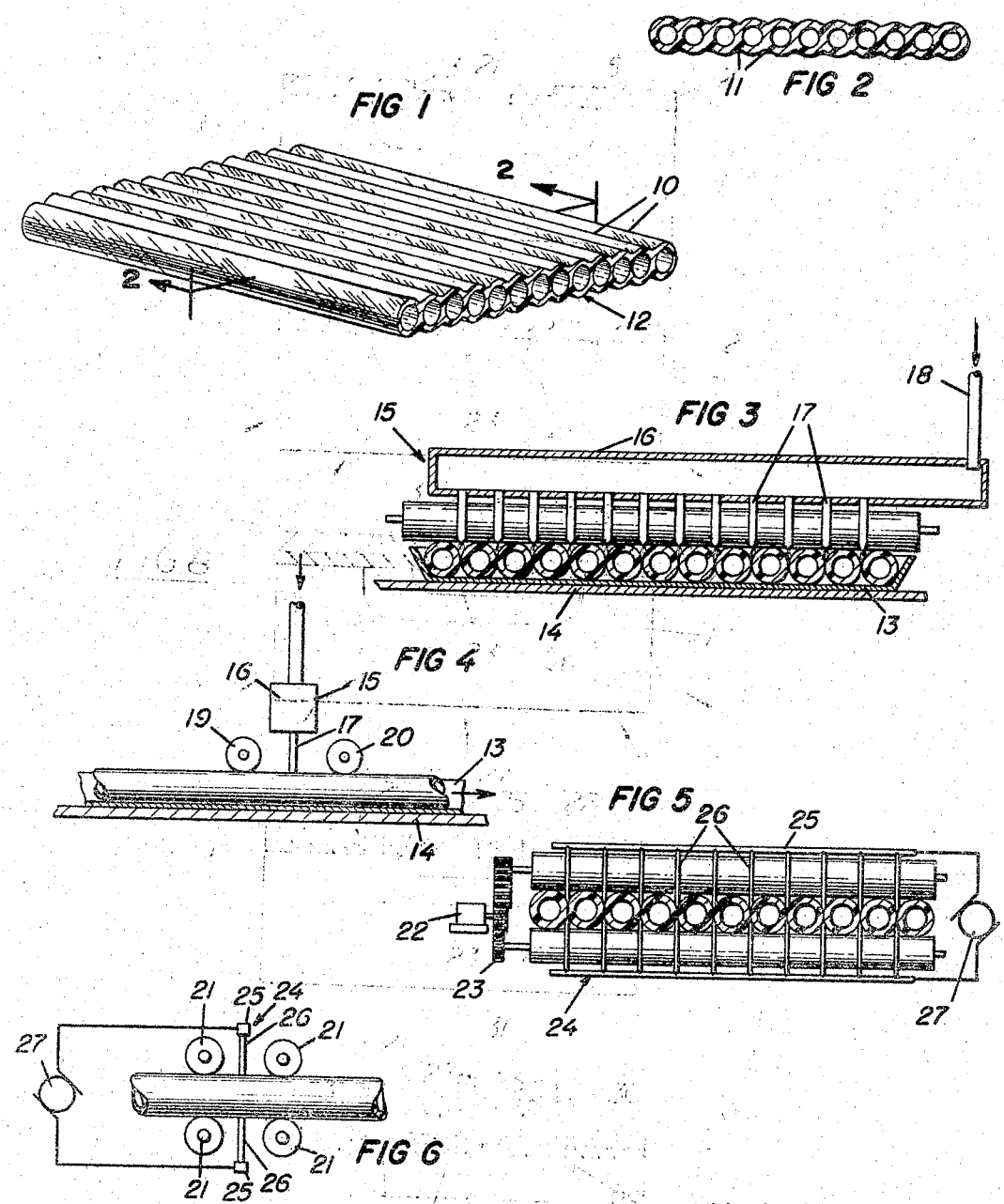

3,312,579
STRUCTURAL MATERIAL AND METHOD
OF MAKING IT
Yasha Heifetz, Rte. 81, Clinton, Conn. 06413
Filed Dec. 12, 1962, Ser. No. 244,180
3 Claims. (Cl. 156—305)

The present invention relates to a structural material made of tubes of synthetic plastic material which are positioned side by side and are joined to each other to form a sheet or panel, and to a method of making such a material.

It has heretofore been proposed to make a structural material of this type by extruding synthetic plastic material in a series of parallel tubes in such close side by side relationship that the extruded parallel tubes, when the plastic solidified, would be joined to each other in a sheet-like material. However, such material, because of the limitations on the sizes of the individual tubes, which must be kept relatively small because of the difficulty in extruding parallel series of them, has found limited use, being generally used in such items as lamp shades, bowls or vases, and the like in which strength is imparted to the material by the structure into which the material is formed.

Because of the good appearance of this type of material and the ease with which it may be worked, and because it can be produced in extremely wide varieties of colors and combinations of colors, it would be advantageous to have it available in a stronger, completely self supporting sheet or panel form for partitions, ceiling sections, doors and the like.

It is an object of the present invention to provide this type of material in a strong, completely self supporting sheet or panel form for use in partitions and the like.

It is a further object of the present invention to provide a method of fabricating this material from a plurality of tubes of synthetic plastic material.

Other and further objects of the present invention will become apparent from the following specification and claims, taken together with the accompanying drawings, in which:

FIG. 1 is a perspective view of a sheet of material according to the present invention;

FIG. 2 is a sectional view taken along line 2—2 of FIG. 1;

FIG. 3 is a schematic front elevation view of an apparatus for making the material of FIGS. 1 and 2;

FIG. 4 is a schematic side elevation view of the apparatus of FIG. 3;

FIG. 5 is a schematic front elevation view of a different apparatus for making the material of FIGS. 1 and 2; and FIG. 6 is a schematic side elevation view of the apparatus of FIG. 5.

As seen particularly in FIGS. 1 and 2, the structural material according to the present invention consists essentially of a plurality of parallel hollow plastic tubes 10 which lie side by side and which are integrally joined to each other at lines of tangency 11 to form a panel 12. It is preferable that the tubes have an outside diameter of at least ¼ inch, and of course they may be larger.

The tubes may all be clear plastic material, such as cellulose acetate butyrate or so-called rigid polyvinyl chloride, i.e., polyvinyl chloride with little or no plasticizer incorporated in it. The plastic of the tubes can have an opaque material incorporated therein, in which case the panel will be opaque. Alternatively, some of the tubes can be opaque and others clear. In the same manner, some or all of the tubes can have coloring incorporated into the plastic material thereof, or certain of the tubes can have one coloring material in the plastic material thereof and other of the tubes can have another coloring material in the plastic material thereof.

One manner of forming a plurality of individual tubes 10 into the panel 12 is illustrated diagrammatically in FIGS. 3 and 4. As seen in these figures, a plurality of tubes 10 are laid side by side in parallel tangent relationship in a tray 13 which holds the tubes against each other and supports them from beneath. The tray 13 with the tubes 10 therein is placed on a conveyor means 14, such as a conveyor table or conveyor belt, and is conveyed beneath a solvent applying means generally designated 15. The solvent applying means 15 comprises a header 16 transverse to the direction of movement of the conveyor means 14 and having a plurality of hollow needles 17 depending therefrom and spaced along the header at distances substantially equal to the diameters of the tubes 10 in the tray 13. The needles 17 extend downwardly between adjacent tubes 10 to a point just above the lines where the tubes are tangent. A supply pipe 18 extends into the header. Ahead of the needles 17 is a roller 19 which holds the tubes 10 flat in the tray ahead of the needles, and behind the needles is another roller 20 which holds the tubes flat in the tray after they have passed under the needles.

In operation, a solvent for the plastic material of the tubes 10 is supplied to the header 16 through the supply pipe 18. This solvent can be alcohol and aromatic hydrocarbons, chlorinated hydrocarbon, fatty acid esters, aromatic hydrocarbons or ketones when the plastic is cellulose acetate butyrate, and can be alcohol when the plastic is rigid polyvinyl chloride. The solvent is supplied to the needles 17 from the header, and it flows through the needles and into the joints between tangent tubes 10 through openings in the ends of the needles 17. After the assembly of tubes 10 have been passed under the needles 17 and solvent deposited at the points of tangency of the tubes, the assembly is turned over, and again passed beneath the needles, either in the reverse direction to the direction of the initial passage, or in the same direction. In the latter instance, it will be understood that the assembly must be carried around the needles and fed beneath them again. On this second pass of the tubes 10 beneath the needles 17, solvent is deposited on the other side of the lines of tangency of the tubes. The tubes are thereby partially dissolved, and upon resolidification of the plastic of the tubes after the solvent has evaporated, the tubes will be integrally joined to each other.

It has been found that when the plastic material of the tubes is cellulose acetate butyrate, it is necessary to place the assembled tubes in an annealing oven and anneal them at a moderate temperature for about 24 hours. Thereafter, they must be stored for several days to allow them to cure. When the plastic materal is polyvinyl chloride, a shorter annealing time and a shorter curing time can be used.

An apparatus for carrying out an alternative method of forming the plurality of tubes into a panel is shown in FIGS. 5 and 6. Two sets of spaced opposed rollers 20 and 21 are provided along the path on which the plastic tubes 10 are to be conducted at points spaced along the path. These rollers are driven by driving means 22 through a gearing 23. Between the sets of rollers 21 and 22 is an electric welding means 24 which comprises two spaced opposed bus bars 25 which have opposed pairs of electrodes 26 extending toward each other with the tips of the electrodes 26 spaced from each other slightly. Alternating current is supplied to the electrodes 26 from a generator 27.

In operation, the assembly of tubes 10 is caused to move between the sets of electrodes 26 by the driving rollers 21 and 22 which also serve to keep the assembly of tubes flat. Alternating current is passed through the plastic material of the tubes to cause dielectric heating of the plastic material in the areas where the tubes are tangent. The heating causes melting of the material at the point of tangency and the plastic material of the tubes flows together to form a weld. Thereafter the assembly of tubes is annealed and cured in the same manner as when the joint is formed by using a solvent. It will be seen that when the electronic welding method is used, however, it is only necessary to pass the assembly of tubes through the apparatus once, since the plastic material is melted throughout the area of the joint which is formed.

The apparatus of FIGS. 5 and 6 can easily be modified slightly to carry out another alternative method of joining the tubes. By changing the circuit from the current supply means 27 so that there is a complete circuit to each electrode 26, and by making the electrodes resistance heaters in the form of long needle-like members, the apparatus will operate to melt the plastic material of the tubes 10 in the vicinity of the line of tangency of adjacent tubes as the tubes are fed between the electrodes 26. Such a conduction heating will be much slower than the dielectric heating, however, and the speed of the tubes past the electrodes will be slow compared to the speed when dielectric heating is used.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawing being merely preferred embodiments thereof.

I claim:

1. A method of making a structural material panel which is made up of a plurality of parallel hollow plastic tubes which are tangent to each other along lines of tangency and which are integral with each other along said lines of tangency, said method comprising the steps of placing the tubes to be formed into the panel in side by side parallel relationship with the tubes tangent along lines of tangency, applying a thin stream of liquid solvent for the plastic material along each pair of adjacent tubes as said lines of tangency to cause the plastic tubes to becomes at least partially liquid, and thereafter solidifying the plastic material at said lines of tangency, whereby the tubes become integral with each other.

2. A method as claimed in claim 1 in which the step of applying the thin stream of liquid solvent for the plastic material comprises applying the thin streams of solvent for the plastic material to both sides of the panel of tubes along the lines of tangency.

3. An apparatus for making a structural panel which is made up of a plurality of parallel hollow plastic tubes which are tangent to each other along lines of tangency and which are joined to each other along said lines of tangency, said apparatus comprising means for holding said parallel tubes in position parallel and tangent to each other and for feeding them in the direction of their length, said means for holding the parallel tubes in position and feeding them comprising a flat tray in which the tubes are supported and held against each other, and two rollers, one on one side of said means for treating the tubes and the other on the other side of the means for treating the tubes and adapted to roll on the tops of the tubes lying in said tray, and a conveyor means beneath said tray for conveying said tray past said means for treating the tubes, and means extending adjacent the lines of tangency between tubes on at least one side of the plurality of tubes for treating the tubes in the vicinity of the lines of tangency to cause the plastic material to become at least partially liquid and comprising a plurality of hollow needles having openings in the ends thereof, and a header from which said needles depend and adapted to feed plastic solvent to said needles.

References Cited by the Examiner

UNITED STATES PATENTS

| | | | |
|---|---|---|---|
| 2,397,743 | 4/1946 | Kaphan | 156—306 |
| 2,438,685 | 3/1948 | Stevens | 156—304 |
| 2,757,710 | 8/1956 | Schanz | 156—304 |
| 2,814,581 | 11/1957 | Flynn | 156—305 |
| 3,009,209 | 11/1961 | Weinbrenner | 156—315 |

EARL M. BERGERT, *Primary Examiner.*

DOUGLAS J. DRUMMMOND, *Examiner.*